Oct. 21, 1930.　　　　　R. D. EVANS　　　　　1,779,393
TRUCK FOR MOTOR VEHICLES
Filed Jan. 9, 1929
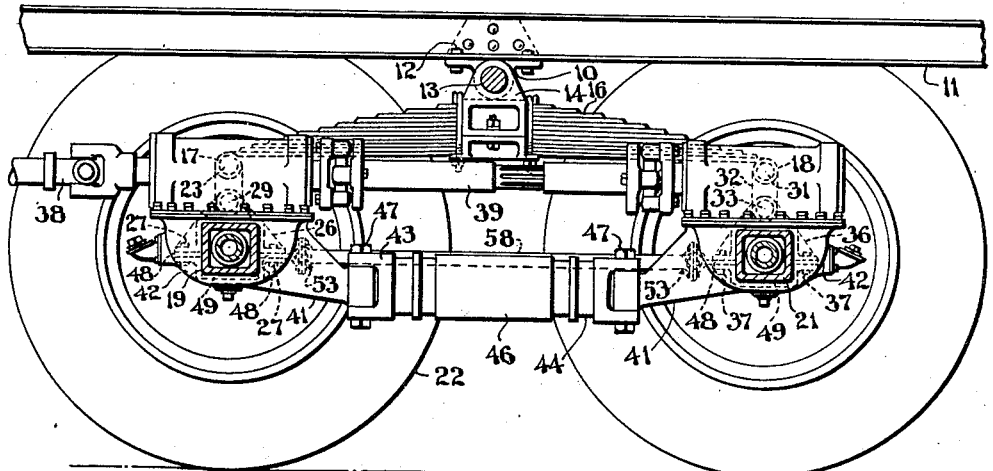
Fig. 1
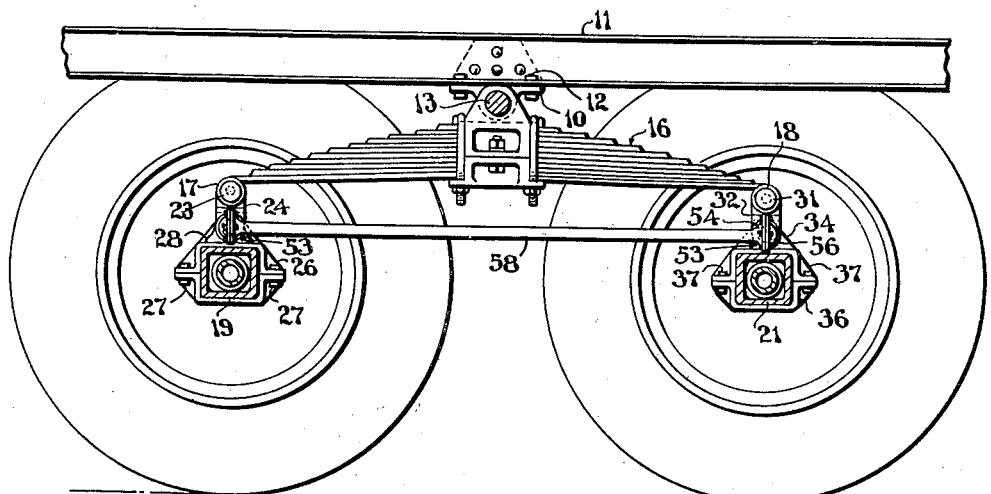
Fig. 2
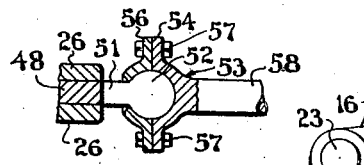
Fig. 3
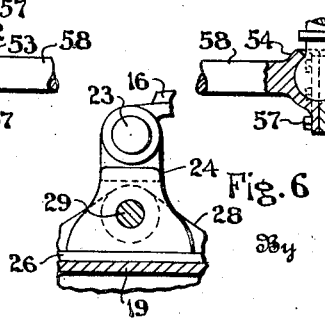
Fig. 6
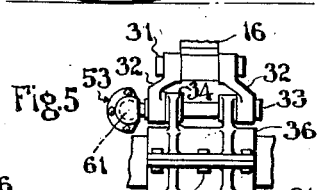
Fig. 4
Fig. 5
Inventor
Rhys D. Evans
Attorney Patented Oct. 21, 1930

1,779,393

UNITED STATES PATENT OFFICE

RHYS D. EVANS, OF AKRON, OHIO, ASSIGNOR TO THE GOODYEAR TIRE & RUBBER COMPANY, OF AKRON, OHIO, A CORPORATION OF OHIO

TRUCK FOR MOTOR VEHICLES

Application filed January 9, 1929. Serial No. 331,304.

This invention relates to vehicle trucks and has particular relation to trucks of the above designated character for six-wheel and eight-wheel motor vehicles.

An object of the invention is to provide a vehicle truck structure in which the axle housings associated therewith will be retained substantially in parallel relation to each other regardless of the conditions under which the truck operates.

Another object of the invention is to provide a truck structure in which axle housings will be in parallel relation without mounting such housings in a rigid frame.

Another object of the invention is to provide attachments for vehicle trucks now being employed in service which can be applied to them without altering materially their present construction.

Prior to the invention, the four wheel trucks employed generally in six and eight wheel motor vehicles consisted of a pair of axle housings disposed substantially in parallel relation, to the opposite ends of which a pair of springs connecting the axles were pivotally secured upon pairs of lugs rigidly supported by the housings. The axles also were provided with devices of various forms for preventing rotational movement of the housings. In such trucks, any unequal deflection of the springs on which the body of the vehicle was supported caused a slight variation in the distance between the corresponding ends of the axle housings, thus moving them out of the normally parallel position. This nonparallelism between the housings, even to a slight degree often caused rapid deterioration of the tires of a truck. Any attempt to secure the housings rigidly together apparently has not been altogether satisfactory by reason of the fact that a certain amount of flexibility is required in order to withstand the severe strains to which such trucks are subjected in service.

This invention provides a solution of this difficulty by connecting the axle housings at suitable points by rods disposed in parallel relation, having ball and socket joints at opposite ends thereof which permit freedom of movement of the housings in any manner, except variation in the distance between them.

For a better understanding of the invention, reference may now be had to the accompanying drawings, forming a part of the specification, in which:

Fig. 1 is a cross-sectional view of a vehicle truck taken substantially along a plane intersecting the truck immediately beyond a corresponding pair of the wheels;

Fig. 2 is a cross-sectional view of a truck illustrating another form which the invention may assume, taken substantially along a plane intersecting the axle housings adjacent one of the springs upon which the vehicle body is partially supported;

Fig. 3 is a fragmentary cross-sectional view of one of the ball and socket joints embodied in the structure illustrated by Fig. 1;

Fig. 4 is a fragmentary cross-sectional view of one of the ball and socket joints embodied in the structure illustrated by Fig. 2;

Fig. 5 is a fragmentary end elevational view of a spring shackle bolt assembly having a ball and socket connection at one end to one of the tie-rods illustrated by Fig. 2; and Fig. 6 is a fragmentary cross-sectional view of an axle housing of the trucks illustrated by both Figs. 1 and 2 indicating the rigid connections between the forward ends of the springs and the corresponding axle housings.

Referring more particularly to Fig. 1; a pair of brackets 10 secured rigidly to the frame of a vehicle 11 by bolts 12, are adapted rigidly to support a shaft 13 upon opposite ends of which a pair of spring brackets 14 are journaled. Parallel springs 16, secured rigidly intermediate their opposite ends within the spring brackets 14 are provided with spring eyes 17 and 18 disposed respectively adjacent front and rear axle housings 19 and 21 of a four-wheel vehicle truck 22. The spring eyes 17, at the forward ends of the springs 16, are adapted to receive pins 23 (see Fig. 6), which are secured adjacent their opposite ends in openings formed adjacent the upper ends of spaced pairs of plates 24. The lower ends of the plates are adapted to abut upper plane surfaces of supporting brackets 26, which are rigidly clamped adjacent the opposite ends of the housing 19 by bolts 27. Parallel lugs 28, projecting from the upper surfaces of the brackets 26 and between the plates 24, are adapted to receive pins 29, which likewise project through openings formed in the plates 24. Thus, each pair of plates 24 is secured rigidly to the axle housing 19 by a single bolt 29.

The eyes 18, at the opposite ends of the springs 16, are adapted to receive pins 31 to which spring shackles 32 are secured. The shackles 32 are mounted on pins 33, which are pivotally supported in openings formed in a pair of lugs 34 projecting in spaced relation from spring supporting brackets 36. Bolts 37 secure the brackets 36 rigidly upon portions of the axle housing 21 adjacent the opposite ends thereof.

The axle housings 19 and 21, which are of the worm drive type, are driven by a main drive shaft 38 and a secondary drive shaft 39. Bosses 41, projecting from the differential housings 42 of the axle housings 19 and 21, are pivotally connected by pins 47 to cylindrical and telescoping sections 43 and 44 of a torque neutralizing mechanism 46.

Plates 48 are secured rigidly by the bolts 27 and 37 between sections of the spring supporting brackets 26 and 36. In order to compensate for the separation of the sections of the brackets caused by the presence of the plates 48, other plates 49 are disposed between the housings 19 and 21 and the lower sections of the brackets. The plates 48 on the adjacent sides of the housings 19 and 21 are provided with stud portions 51 (see Fig. 3) at the ends of which balls 52 are formed.

Sockets 53, composed of registering sections 54 and 56, secured rigidly together by bolts 57, are formed at opposite ends of tie-rods 58. The balls 52 are adapted to be received within the sockets 53 and are rotatable at least a small angular distance in any direction therein.

In the form of invention illustrated by Fig. 2, corresponding ends of the pins 29 and 33 are provided with balls 61, thus dispensing with the necessity for employing the plates 48 and 49 between the sections of the housing 26 and 36. The sections 54 and 56 of the sockets 53 are slightly modified to permit the pins supporting the balls 61 to project within the sockets at right angles to the tie-rods 58.

It is apparent, by employing the invention, that a very great improvement in the construction of vehicle trucks may be made without changing essentially the design of such trucks now in production or in service. The tie-rod and ball and socket structure makes possible a large increase in the service rendered by the tires of vehicles having such trucks, as compared with the service rendered by tires employed on the trucks as heretofore constructed. This increase in tire service is accounted for entirely by reason of the uniform parallel relation of the axle housings, which results directly from the employment of the tie-rods. It will be observed that a truck structure, when modified in accordance with this invention, retains, to a large extent, the flexibility which is previously embodied and consequently will be capable of yielding slightly to accommodate the relatively large internal stresses developed during the operation of vehicles upon which such trucks are employed.

Although I have illustrated but the preferred forms which the invention may assume and have described those forms in detail, it will be apparent to those skilled in the art that the invention is not so limited but that various modifications may be made therein without departing from the spirit of the invention or from the scope of the appended claim.

What I claim is:

A motor vehicle truck comprising a pair of axle housings disposed in substantially parallel relation, means for preventing rotational movement of the housings, pins having a ball-head at one end operatively associated with the housings, a pair of springs mounted on the pins, and a pair of rods having sockets at each end which are connected to the ball-heads of the pins for preventing unequal separational movement of the housings.

In witness whereof, I have hereunto signed my name.

Signed at Akron, in the county of Summit and State of Ohio, U. S. A., this 7th day of January, 1929.

RHYS D. EVANS.